United States Patent
Inoue et al.

(10) Patent No.: US 8,375,390 B2
(45) Date of Patent: Feb. 12, 2013

(54) SCHEDULING METHOD AND SCHEDULING APPARATUS

(75) Inventors: Keisuke Inoue, Kanagawa (JP); Seiji Murata, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 1401 days.

(21) Appl. No.: 11/996,361

(22) PCT Filed: May 31, 2006

(86) PCT No.: PCT/JP2006/310907
§ 371 (c)(1),
(2), (4) Date: Feb. 13, 2008

(87) PCT Pub. No.: WO2007/020739
PCT Pub. Date: Feb. 22, 2007

(65) Prior Publication Data
US 2009/0031315 A1 Jan. 29, 2009

(30) Foreign Application Priority Data
Aug. 15, 2005 (JP) ................................. 2005-235582

(51) Int. Cl.
*G06F 9/46* (2006.01)
(52) U.S. Cl. ..................................................... 718/102
(58) Field of Classification Search ............... 718/102, 718/103
See application file for complete search history.

(56) References Cited

U.S. PATENT DOCUMENTS

| | | | | |
|---|---|---|---|---|
| 4,084,228 A * | 4/1978 | Dufond et al. | ................ | 718/103 |
| 4,796,178 A * | 1/1989 | Jennings et al. | .............. | 718/103 |
| 7,802,255 B2 * | 9/2010 | Pilkington | .................... | 718/102 |
| 2003/0110203 A1 * | 6/2003 | Brenner et al. | ............... | 709/103 |

FOREIGN PATENT DOCUMENTS

| | | |
|---|---|---|
| EP | 1544738 A | 6/2005 |
| JP | 4024828 A | 1/1992 |
| JP | 7146799 A | 6/1995 |
| JP | 2505526 B2 | 4/1996 |
| JP | 2804478 B2 | 7/1998 |
| JP | 2242434 A | 9/2006 |

OTHER PUBLICATIONS

English Translation of JP04024828.*

(Continued)

*Primary Examiner* — Thomas Lee
*Assistant Examiner* — Xuxing Chen
(74) *Attorney, Agent, or Firm* — Matthew B. Dernier, Esq.; Gibson & Dernier LLP

(57) ABSTRACT

Thread information is retained in a main memory. The thread information includes a bit string and last executed information. Each bit of the bit string is allocated to a thread, and the number and the value of the bit indicate the number of the thread and whether or not the thread is in an executable state, respectively. The last executed information is the number of a last executed thread. A processor rotates the bit string so that a bit indicating the last executed thread comes to the end of the bit string. It searches the rotated bit string for a bit corresponding to a thread in the executable state in succession from the top, and selects the number of the first obtained bit as the number of the next thread to be executed. Then, the thread information is updated by changing the value of the bit of this number to indicate not being executable, and setting the last executed information to the number of this bit. This operation is performed by using an atomic command.

12 Claims, 7 Drawing Sheets

OTHER PUBLICATIONS

English Translation of JP02242434.*
International Search Report for International application PCT/JP2006/310907.
International Preliminary Report on Patentability for International application PCT/JP2006/310907.
Extended search report for corresponding European Application EP06756827, dated Jan. 15, 2010.
Office Action for Japanese Patent Application No. 2005-235582, dated Jul. 12, 2011.

* cited by examiner

SCHEDULING METHOD AND SCHEDULING APPARATUS

BACKGROUND

The present invention relates to a method and apparatus for scheduling execution units of parallel processing in a multiprocessor system.

Recent operating systems that support multitasking realize a multitasking environment in which a plurality of processes can be executed simultaneously, and implement a multithread technology by which these processes can generate a plurality of threads inside the processes allowing for parallel processing. Processes are allocated unique resources or address spaces at the time of execution, and are incapable of accessing the areas of the other processes. In contrast, threads are execution units generated inside the processes, and each thread can access the areas of the other threads freely within its own process. Threads are the basic execution units for an operating system to allocate CPU (Central Processing Unit) execution time to. As employed herein, thread allocation will be referred to as scheduling.

A multiprocessor system, or a system that implements a plurality of processors, can perform processing in parallel or in a cooperative fashion to achieve speedup of the entire processing. In multiprocessor systems, executable threads are usually retained in a queue called a task queue on a shared memory. These threads are allocated to any of the processors for execution. Since the process execution speed, the memory consumption, and other performance depend upon the method of thread allocation, multiprocessor systems require some contrivance that is different from the scheduling used in single-processor systems.

In a possible example of the scheduling method used in a multiprocessor system, a management unit in charge of managing threads may communicate with individual processors and schedule threads to be allocated to the respective processors.

This method in which the management unit performs scheduling has the problem that communication between the management unit and the processors often cause a message delay and can delay the execution of the threads. Among the possible solutions to this problem is a method in which each individual processor performs scheduling in an autonomous fashion. In this method, the processors run respective schedulers thereon and access a task queue on a shared memory to select threads to execute.

According to this method, each processor locks the task queue while executing its scheduler, i.e., during scheduling, so as to prevent the task queue on the shared memory from being modified by the other processors. This puts system designers in a dilemma as to whether or not to disable interrupts in the meantime.

If interrupts are not disabled during scheduling, the interrupts can be accepted while the task queue is locked by a scheduler. In this case, scheduling will not be performed until the interrupt processing ends and the task queue is unlocked, resulting in a reduction in system efficiency.

Conversely, if interrupts are disabled during scheduling, the problem occurs where the system drops in interrupt response. These problems are not only associated with kernel schedulers which run on the multiprocessors described so far, but also apply to user-level schedulers in a multiprocessor multithreading environment (that is, a mode where schedulers are executed on threads running on the respective processors so that multithreading is achieved at the user level).

In particular, since kernel threads that execute the user-level schedulers are scheduled by kernel-level schedulers on the respective processors and thus have the possibility of being preempted by other kernel threads, the locking of the task queue may cause more serious problems. In this case, if a kernel thread is preempted while the user-level scheduler running thereon is locking, then the user-level schedulers running on threads of the other processors cannot perform scheduling until the lock is released.

SUMMARY OF THE INVENTION

The present invention has been achieved in view of the foregoing circumstances, and a general purpose thereof is to provide a scheduling technology capable of controlling the order in which execution units of parallel processing in a multiprocessor system are allocated to processors in order to provide improved processing efficiency.

One embodiment according to the present invention relates to a method for scheduling execution units to be executed by processors in a multiprocessor system. This scheduling method includes: giving an identifier to each of the execution units to be executed by a plurality of processors included in a multiprocessor system; and retaining execution unit information including executable-or-not information and last executed information, the executable-or-not information indicating whether each of the execution units is in an executable state or not in association with the identifier of the execution unit, the last executed information indicating the identifier of a last executed execution unit among the execution units. Then, the identifier of any one of executable execution units is selected as the identifier of an execution unit to be executed by a processor based on the execution unit information under a constraint that an identifier other than the identifier of the last executed execution unit is selected by priority, and the execution unit information is updated.

This embodiment of the present invention may be applied to a system in which scheduling is performed by a management unit, or may be applied to a system in which scheduling is performed by each individual processor itself.

Moreover, this embodiment of the present invention may be applied not only to schedulers that run directly on respective processors, but also to a system that uses user-level scheduler to run on threads provided by the schedulers of the respective processors.

In this instance, the executable-or-not information may be retained in the form of a bit string each single bit of which is allocated to each execution unit as an identifier, and the selecting of the bits and the updating of the execution unit information may be performed by an indivisible operation, i.e., an atomic operation.

"Indivisible operations" refer to minimum units of operations which cannot be divided any further. In multiprocessor systems, they refer to operations that can be executed without interaction with the operations of other processors.

Arbitrary combinations of the aforementioned constituting elements, and implementations of the present invention in the form of systems, programs, and recording media containing a program may also be practiced as applicable embodiments of the present invention.

The present invention is advantageous when scheduling execution units of parallel processing in a multiprocessor system.

DESCRIPTION OF REFERENCE NUMERALS

Figure 1:
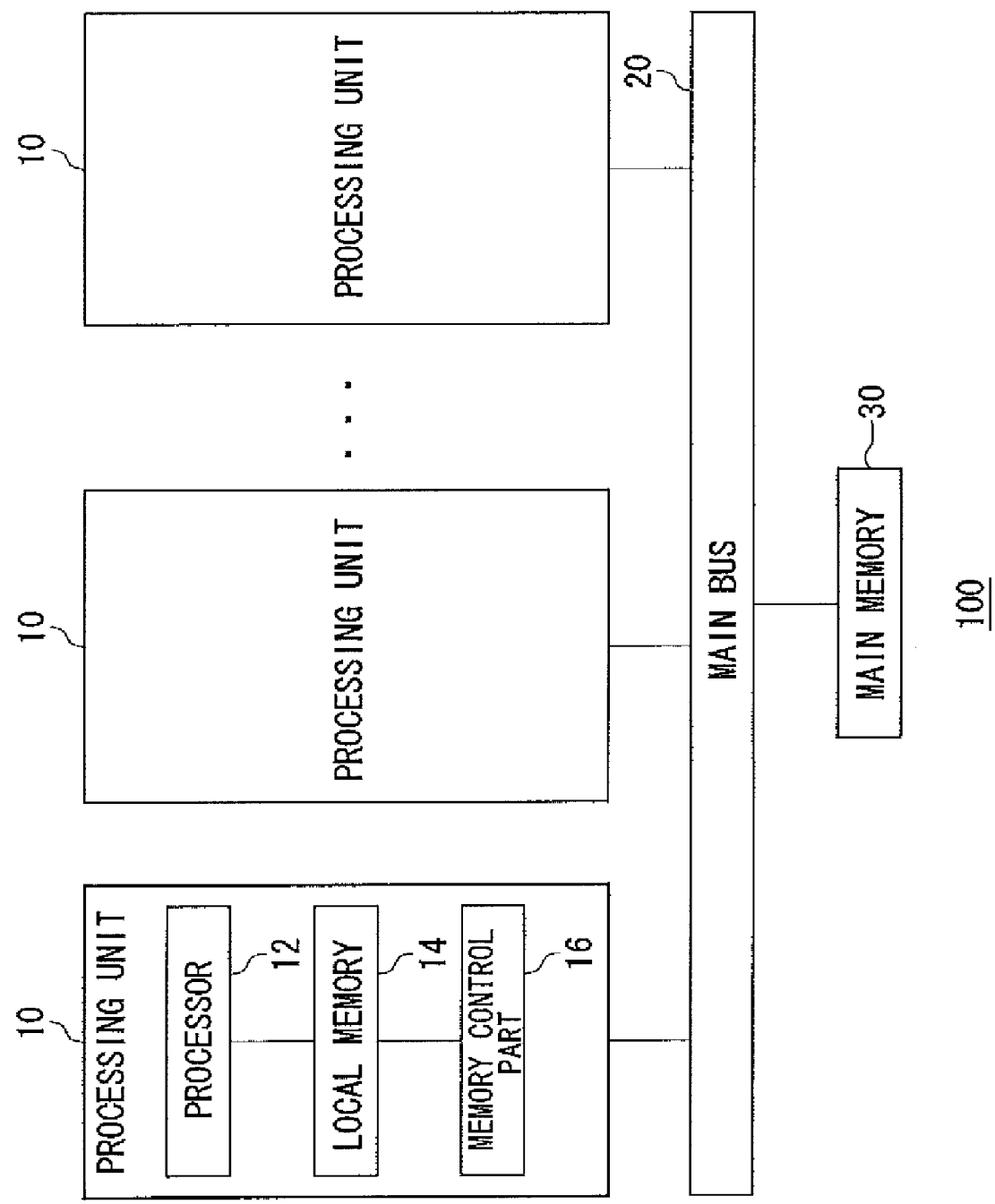
FIG. 1 is a diagram showing a multiprocessor system which is an embodiment according to the present invention.

10 . . . processing unit, 12 . . . processor, 14 . . . local memory, 16 . . . memory control part, 20 . . . main bus, 30 . . . main memory, 40 . . . thread information, 50 . . . thread address information, 60 . . . thread entity, 100 . . . multiprocessor system, 110 . . . processing unit, 112 . . . processor, 114 . . . memory control part, 120 . . . main bus, 130 . . . main memory.

DETAILED DESCRIPTION OF THE INVENTION

In multiprocessor systems, it has been necessary to lock a task queue while scheduling execution units, such as threads, of respective processors in order to prevent the thread-containing task queue from being modified by other processors.

This locking has posed a dilemma in that the interrupt response of the system drops if interrupts are disabled during scheduling, and scheduling cannot be performed until interrupt processing ends and the task queue is unlocked if interrupts are not disabled.

To solve the foregoing problem, the inventor has proposed the following technology.

First, assign identifiers to respective threads. Retain thread information including executable-or-not information and last executed information, the executable-or-not information indicating whether each of the threads is in an executable state or not in association with the identifier of the thread, the last executed information indicating the identifier of the last executed thread among the threads. Then, select the identifier of any one of the executable threads as the identifier of a thread to be executed by a processor based on the thread information under a constraint that an identifier other than the identifier of the last executed thread is selected by priority.

In this instance, the entities of the threads (hereinafter, referred to as thread entities) may be retained by any method as long as the processors can acquire them based on the identifiers selected. For example, the thread entities may be stored in association with their identifiers. The thread entities may be stored in respective predetermined areas of a memory while the starting addresses of the areas containing the thread entities are stored in the memory in association with the identifiers.

According to this technology, the thread entities and the thread information necessary for selecting which thread to execute are stored in the memory separately. This eliminates the need to lock the areas that contain the thread entities when performing scheduling, and can thus solve the dilemma of whether or not to disable interrupts during scheduling.

This technology can solve the foregoing dilemma even in systems that run user-level schedulers, and can solve problems ascribable to the user-level schedulers as well.

Consider, for example, a multiprocessor system or an asymmetric multiprocessor system in which OS (Operating System) functions can only be performed by limited processors in particular. The use of user-level schedulers is considered to be an effective way of improving the processing efficiency of the multiprocessor system, i.e., to create user-level threads on kernel threads provided by the OSes running on the respective processors and perform scheduling in an autonomous fashion. This method has a problem of failed scheduling due to the use of the user-level schedulers.

For example, a thread that runs a user-level scheduler can be scheduled by a kernel scheduler on each processor and possibly be preempted by another kernel thread. Thus, if the thread is preempted while the user-level scheduler running thereon is locking, the user-level scheduler, running on a thread of another processor, cannot perform scheduling until the lock is released. This lowers the processing efficiency of the processor. In addition to this, the time to unlock depends on various situations and is thus difficult to estimate, which may contribute to the occurrence of system instability.

Consider now a conventional multiprocessor system in which each individual processor executes a kernel scheduler which operates autonomously. Consider the case where thread 1, thread 2, and thread 3 are put in a task queue, and processor A out of a plurality of processors becomes capable of executing a thread in the task queue.

In order to select which thread to execute, the processor A temporarily copies the task queue to its own local memory, and selects, for example, the thread 1 from the task queue. Then, it performs update processing of deleting the thread 1 from the task queue, and writes the updated task queue back to the main memory. From when copying the task queue is started to when writing back the task queue is finished, the processor A locks the task queue so as to prevent the task queue on the shared memory from being modified by other processors. While the task queue is locked, the other processors cannot use the task queue even if they become capable of executing threads in the task queue. Consequently, the longer the lock period is, the lower the processing efficiency of the system becomes.

Moreover, the scheduler running on the processor A has the possibility of being preempted by an interrupt as mentioned above. If the processor A is locking the task queue when preempted, the other processors cannot perform scheduling and cannot execute the thread 2 or 3 until the processor A returns from the interrupt processing and unlocks the task queue. As a result, the system not only suffers a reduction in processing efficiency but may become unstable as well. The foregoing description also applies to systems that run user-level schedulers if the processors A, . . . are substituted with threads that execute the user-level schedulers running on the processors A, . . . (such as threads a, . . . ). Specifically, in a system that runs user-level schedulers, for example, the thread a that executes the user-level scheduler running on the processor A can also be preempted by an interrupt. If the thread a is preempted while the task queue is locked, the other threads cannot perform scheduling until the thread a returns from the interrupt processing and the task queue is unlocked.

That is, even in systems that use user-level schedulers, the locking of the task queue also produces the problem that the system may suffer a reduction in processing efficiency and become unstable.

Moreover, in a multiprocessor system, individual processors exist such that they are included in the respective processing units. These processing units can be classified into PPUs (Power Processing Units) and SPUs (Synergistic Processing Units). All the SPUs need not be practiced in an identical architecture, and may have different respective configurations. The PPUs may be positioned local to the SPUs, such as on the same chip, in the same package, on the same circuit board, or in the same product as the SPUs are. They may otherwise be positioned remote from the SPUs, such as on products that are connectable over a bus, over the Internet, or over other communication networks. Similarly, the SPUs may be positioned local to or remote from each other.

The presence of scheduling-disabled intervals and difficulty in estimating the disabled durations can cause a reduction in the processing efficiency of a multiprocessor system. If all the threads that execute user-level schedulers are the threads of SPUs (hereinafter, referred to as SPU threads), this problem can be solved using a method of grouping threads and performing scheduling in units of groups. Here, a description will be given in conjunction with a multiprocessor system shown in FIG. 9.

Figure 9:
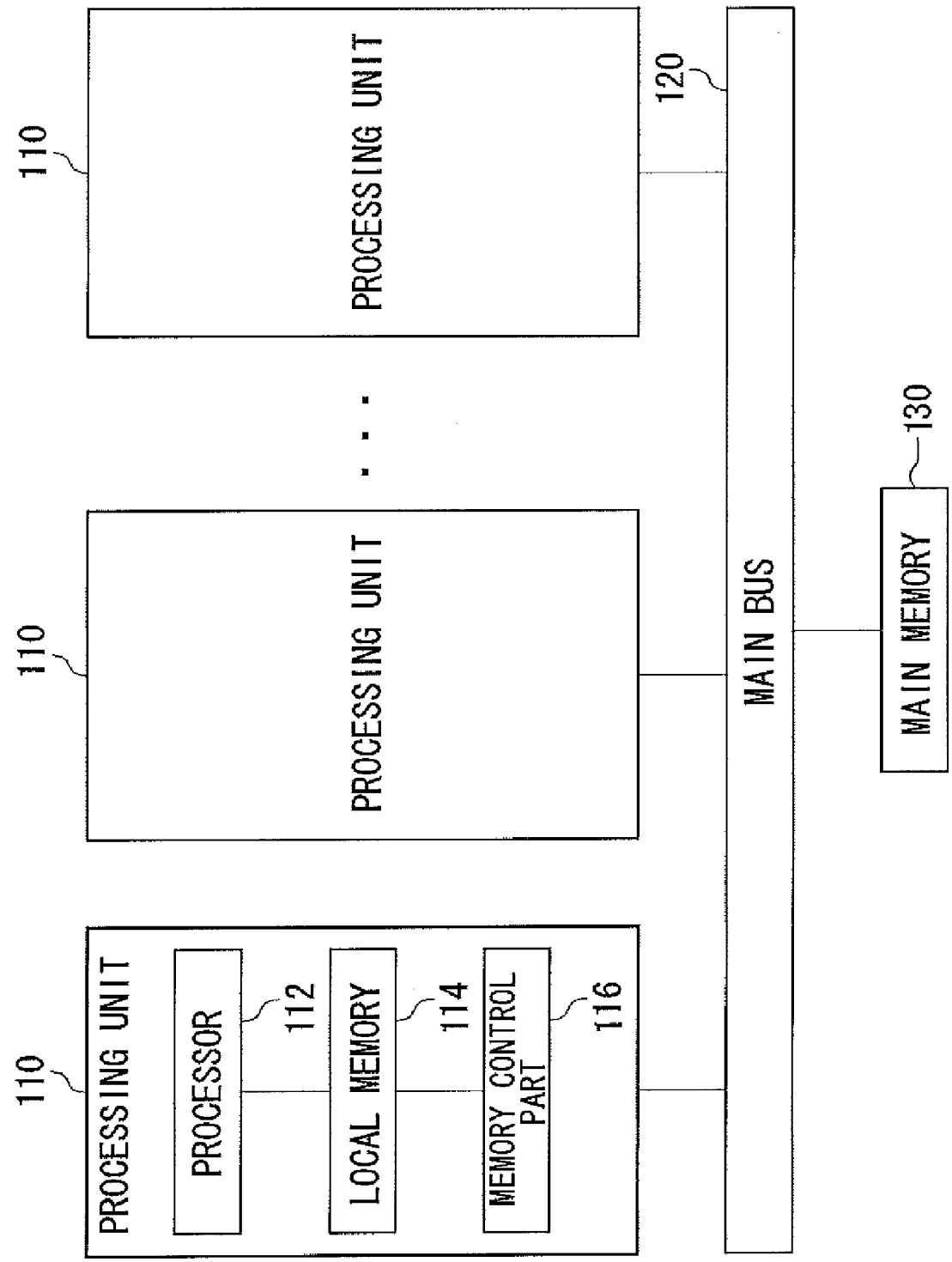
FIG. 9 is a diagram showing an example of a multiprocessor system that uses user-level schedulers.

The multiprocessor system shown in FIG. 9 has a plurality of processing units 110 and a main memory 130, all of which are connected to a main bus 120. Each processing unit 110 has a processor 112, a local memory 114, and a memory control part 116. The processor 112 is capable of reading and writing data from/to the local memory 114. The memory control part 116 provides an interface when the processors 112 of the other processing units 110 access data in the local memory 114, and also provides the functions of memory synchronization and exclusive control.

Figure 10:
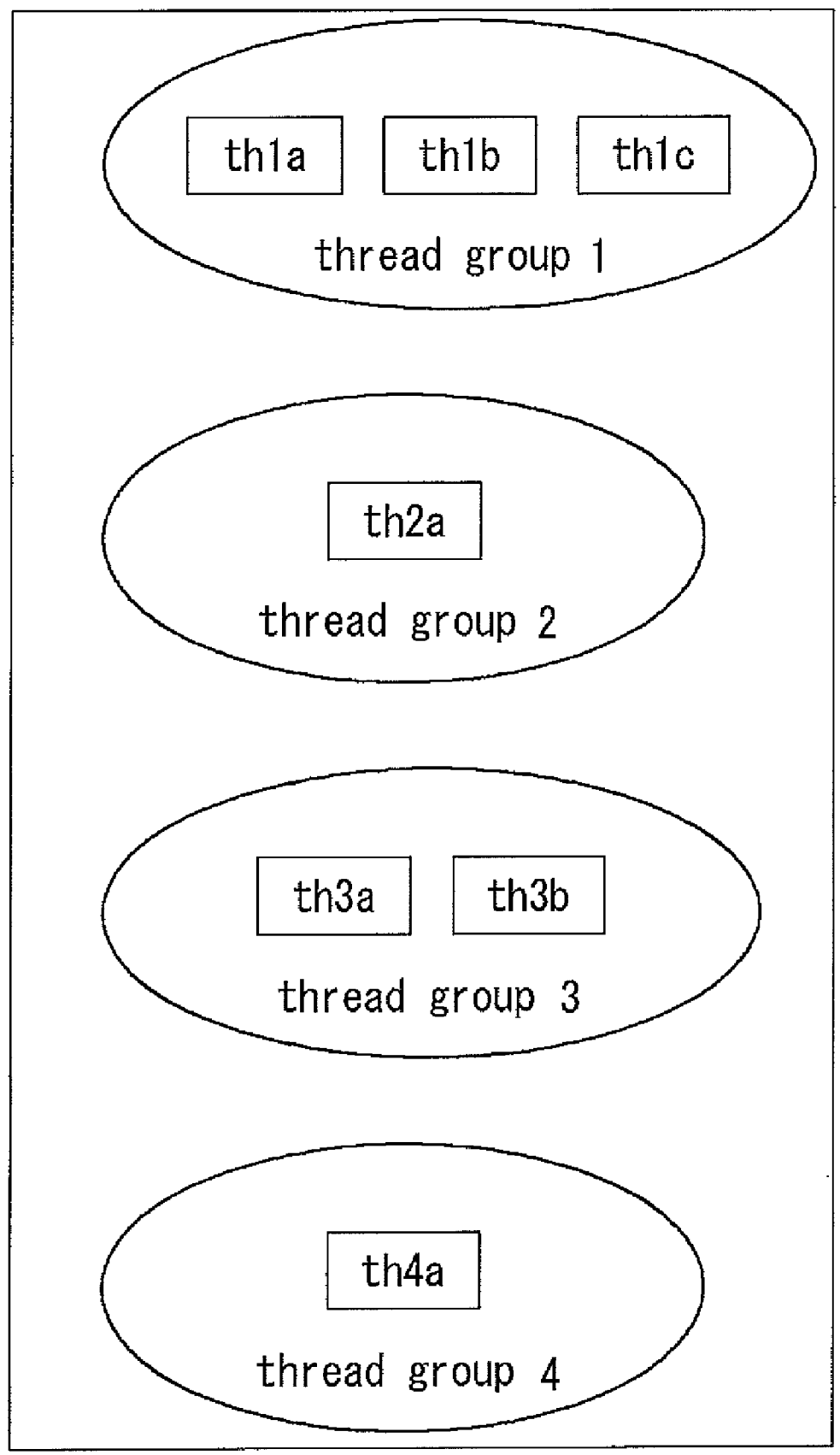
FIG. 10 is a diagram showing an example of grouping of threads in the multiprocessor system shown in FIG. 9.

Consider now a situation where a task queue formed in the main memory 130 contains SPU threads alone. In this instance, the threads in the task queue are grouped as shown in FIG. 10. In FIG. 10, thread group 1 includes three threads th1a, th1b, and th1c. Thread group 2 includes one thread th2a. Those including only a single thread like this shall also be handled as thread groups. Similarly, thread group 3 includes two threads th3a and th3b. Thread group 4 includes one thread th4a.

These threads are scheduled on the precondition that all threads belonging to an identical thread group be allocated to any of the processors 112 simultaneously. The thread group 1 is allocated to the processors 112 only if the three threads th1a, th1b, and th1c belonging to the thread group 1 can be allocated to some of the processors 112 simultaneously. It is not acceptable to create such a situation where one or two of the three threads th1a, th1b, and th1c are allocated to a processor or processors 112 while the rest is/are saved to the main memory 130.

Figure 11:
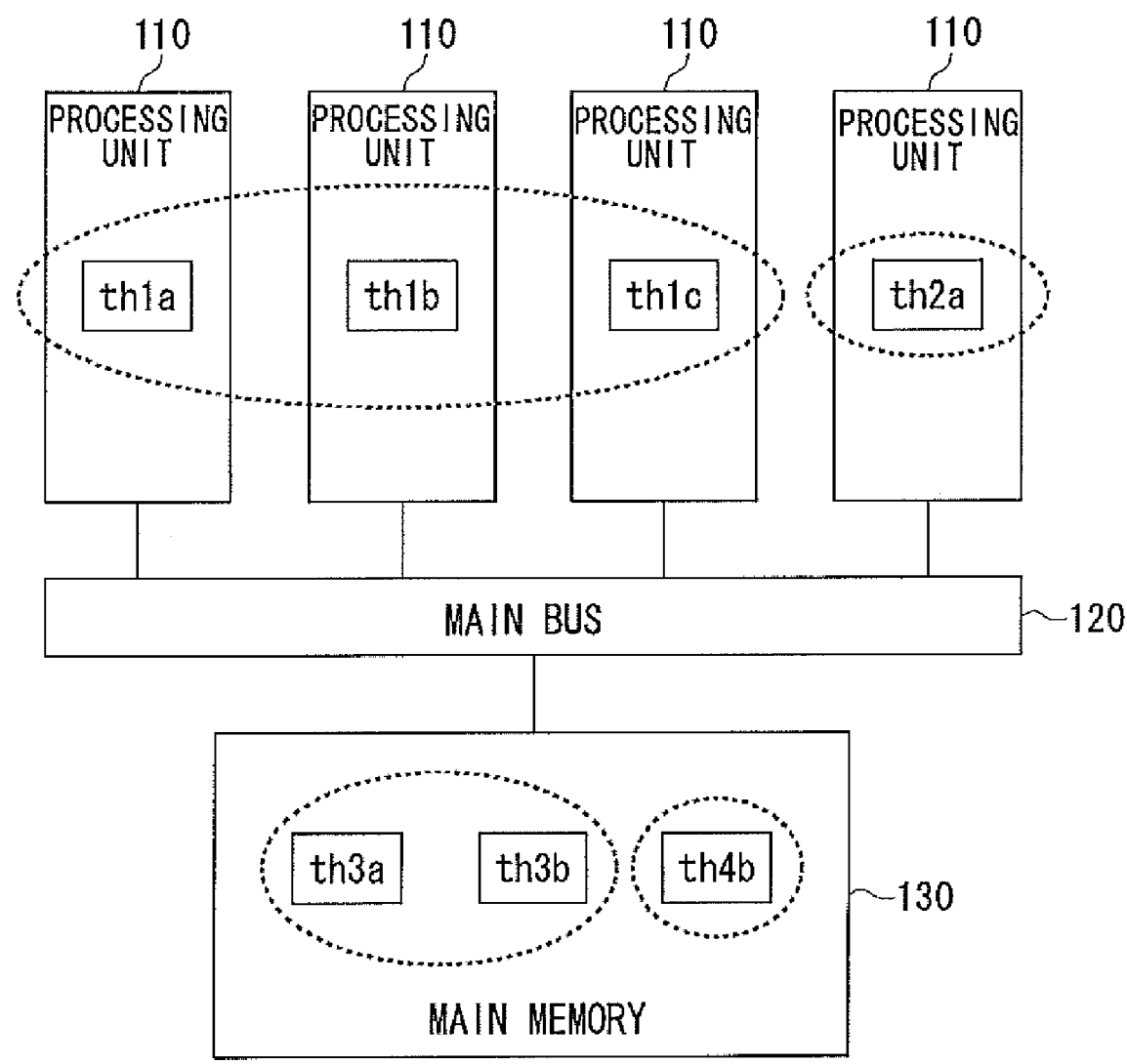
FIG. 11 is a diagram showing an example of scheduling of threads in the multiprocessor system shown in FIG. 9.

FIG. 11 is a diagram for explaining how threads are allocated to the processors 112 in units of thread groups. The diagram shows a multiprocessor system with a total of four processors in which threads belonging to the four thread groups shown in FIG. 10 are allocated to processors 112. At one point in time, the three threads th1a, th1b, and th1c belonging to the thread group 1 are allocated to a first processor, a second processor, and a third processor, respectively, and the single thread th2a belonging to the thread group 2 is allocated to a fourth processor. The remaining two threads th3a and th3b belonging to the thread group 3 and the single thread th4a belonging to the thread group 4 are saved to the main memory 130

In such a system, a plurality of threads belonging to one thread group is always allocated to some of the processors simultaneously. Since a locking thread in a thread group will not be preempted alone, it is possible to limit any disabled scheduling intervals.

In an environment where threads of PPUs (hereinafter, referred to as PPU threads) and SPU threads are scheduled asynchronously, however, the following problem can occur when the PPU threads and the SPU threads share the same task queue. If one PPU thread is preempted by another PPU thread while locking the task queue, then SPU threads must wait until this PPU thread is executed again. This makes it impossible to limit any disabled scheduling intervals.

According to the scheduling technology proposed by the inventors, thread information and thread entities are stored separately, so that processors have only to load the thread information when selecting which thread to execute. After the end of the selection and of the updating of the thread information (specifically, the processing of changing the identifier of the last executed thread to the identifier of the selected thread, and the processing of modifying the identifier of the selected thread so as to indicate that the thread corresponding to this identifier is not executable), the updated thread information is stored into the main memory. Subsequently, the processor copies the thread entity corresponding to the selected identifier. During copying, the other processors can also use the thread information. This can reduce the time the thread information is occupied by a processor, thereby decreasing any reduction in the processing efficiency of the entire system even if the thread information is locked.

Furthermore, the inventors proposes to retain the executable-or-not information in the form of a bit string each single bit of which is allocated to each thread as an identifier. This makes it possible to perform the selecting of the threads and the updating of the thread information and the like which can be performed using an atomic operation or atomic command, and to realize a task queue that entails no lock operation, i.e., a lockless task queue. The absence of lock operations naturally solves every problem ascribable to the locking of the task queue described above.

FIG. 1 shows the configuration of a multiprocessor system 100 which is an embodiment of the present invention. The multiprocessor system 100 has a plurality of processing units 10 and a main memory 30, all of which are connected to a main bus 20. Each processing unit 10 has a processor 12, a local memory 14, and a memory control part 16. The processor 12 is capable of reading and writing data from/to the local memory 14. The memory control part 16 provides an interface when the processors 12 of the other processing units 10 access data in the local memory 14, and also provides the functions of memory synchronization and exclusive control.

Any one of the processing units 10 plays the role of a service unit with respect to the other processing units when scheduling threads. For example, the role of the service unit pertains to the allocation of the main memory 30, the initial thread-related storing in the main memory 30, and the like. The allocation of the main memory 30 may include, for example, determining the area to be allocated to thread information, the capacity of the area, and the memory capacity to be allocated to the thread entities.

Any of the processing units 10 may be in charge of this service unit.

At one point in time, the processors 12 run a single thread each so that the entire multiprocessor system 100 executes a plurality of threads in parallel. The thread running on each processor 12 can occupy and use all the resources within the processing unit 10, such as the local memory 14, and registers in the memory control part 16.

In this state, the contexts of waiting threads are retained in the main memory 30. The context of a thread has the statuses of all the resources that the thread occupies in the executed processing unit 10. The context includes a set of values retained in various registers, data retained in the local memory 14, and the internal states of various registers in the memory control part 16 when the thread is running on the processor 12. When the thread is not running on the processor 12, the context of the thread is copied to the main memory 30 so that the context can be read from the main memory 30 to continue processing again when it becomes processable by the processor 12. The context of a thread corresponds to a thread entity.

Figure 2:
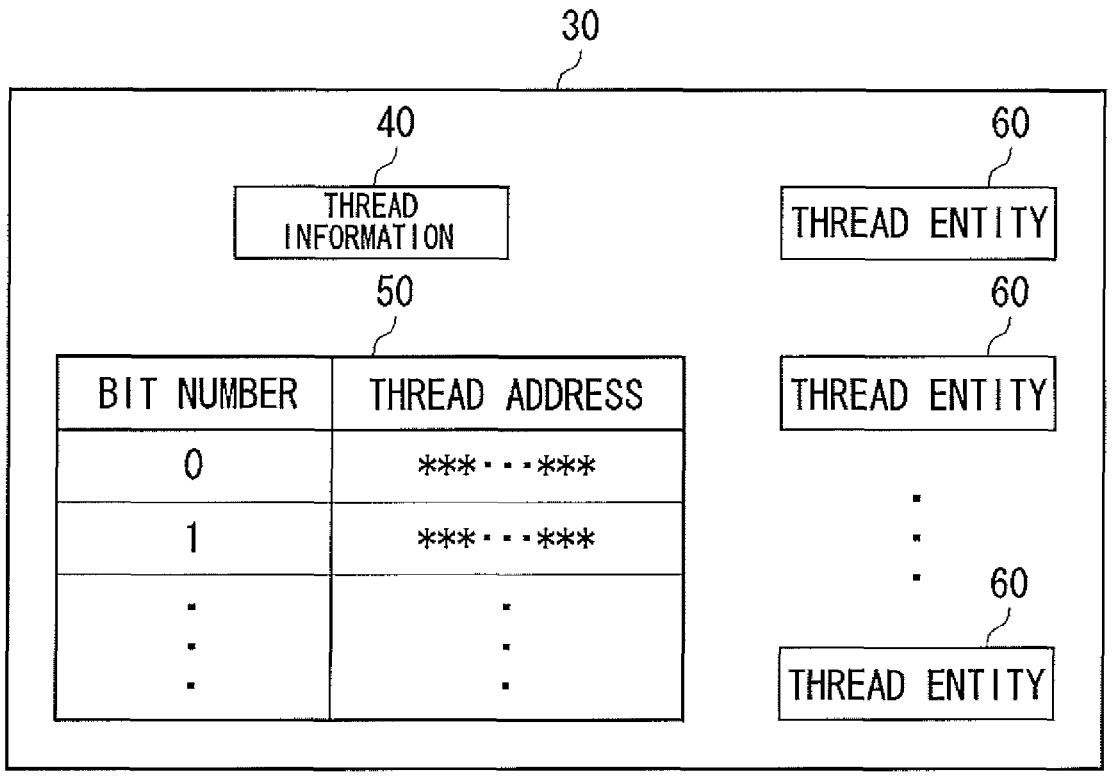
FIG. 2 is a diagram showing a task queue of the multiprocessor system shown in FIG. 1.

FIG. 2 shows thread-related information stored by the main memory 30. These pieces of information consist of thread information 40, thread address information 50, and thread entities 60, and play the role of a task queue in the multiprocessor system 100. The areas for storing these pieces of information are allocated by the service unit and communicated to the other processing units 10.

Figure 3:
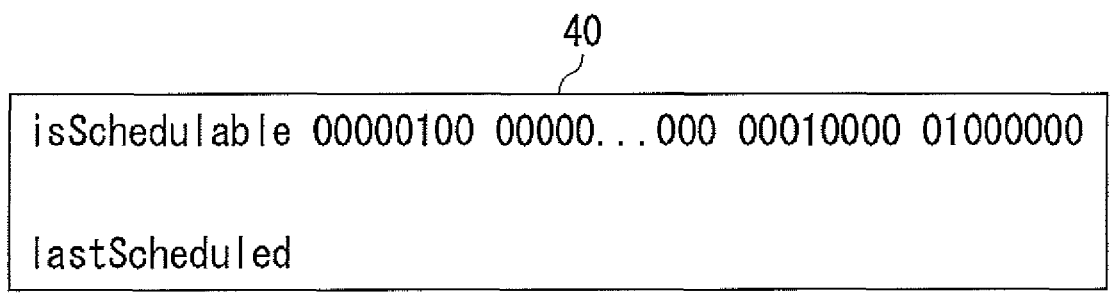
FIG. 3 is a diagram showing the configuration of thread information contained in the task queue shown in FIG. 2.

The thread information 40 includes executable-or-not information and last executed information. The executable-or-not information consists of identifiers assigned to respective threads, associated with information indicating whether the respective threads are in an executable state or not. FIG. 3 shows the thread information 40 in detail.

The bit string (isSchedulable) is the executable-or-not information. Each single bit included therein corresponds to a single thread, and the bit number corresponds to the number of the thread. The multiprocessor system 100 uses the bit number itself as the thread number for the sake of simplified processing.

The values of the bits of the bit string isSchedulable indicate whether the threads corresponding to the respective bits are in an executable state or not. In this instance, a bit value "1" shall indicate being executable, and "0" shall indicate not being executable. The number of bits included in the bit string isSchedulable corresponds to the capacity of the area allocated for retaining the executable-or-not information. Here, it shall be 128 bits.

The variable lastScheduled takes on an integer value that indicates the number of the last executed bit among the bits included in the bit string isSchedulable.

Figure 4:
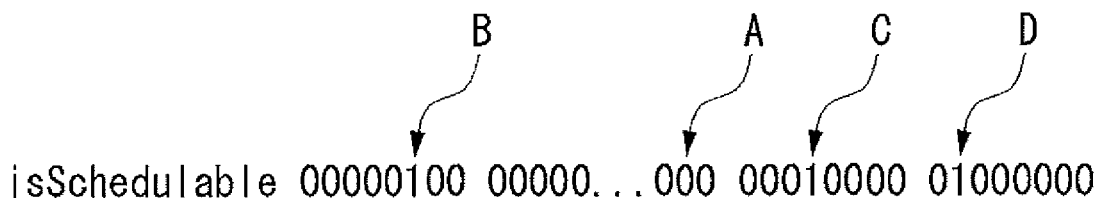
FIG. 4 is a diagram for explaining the thread information shown in FIG. 3 in detail.

As shown in the example of FIG. 4, the number of the executable threads and the number of the last executed thread are indicated by isSchedulable and lastScheduled. In the example shown in FIG. 4, the bit string isSchedulable contains three bits that have a value of "1" (in the diagram, the bits designated by the arrows B, C, and D). The threads corresponding to these three bit numbers are executable threads. The threads corresponding to the other bits of "0" in value are not executable. The thread corresponding to a bit number equal to the value of lastScheduled (in the diagram, the number of the bit designated by the arrow A) is the last executed thread, which is in an unexecutable state.

The thread address information 50 is information obtained by associating the numbers of the respective threads, or the numbers of the bits included in the bit string isSchedulable in this case, and the starting addresses of areas where thread entities corresponding to the numbers are stored. Which address area to store what number of thread entity in is determined by the service unit.

If there is no waiting thread, each bit of the bit string isSchedulable in the thread information 40 has a value of "0."

Figure 5:
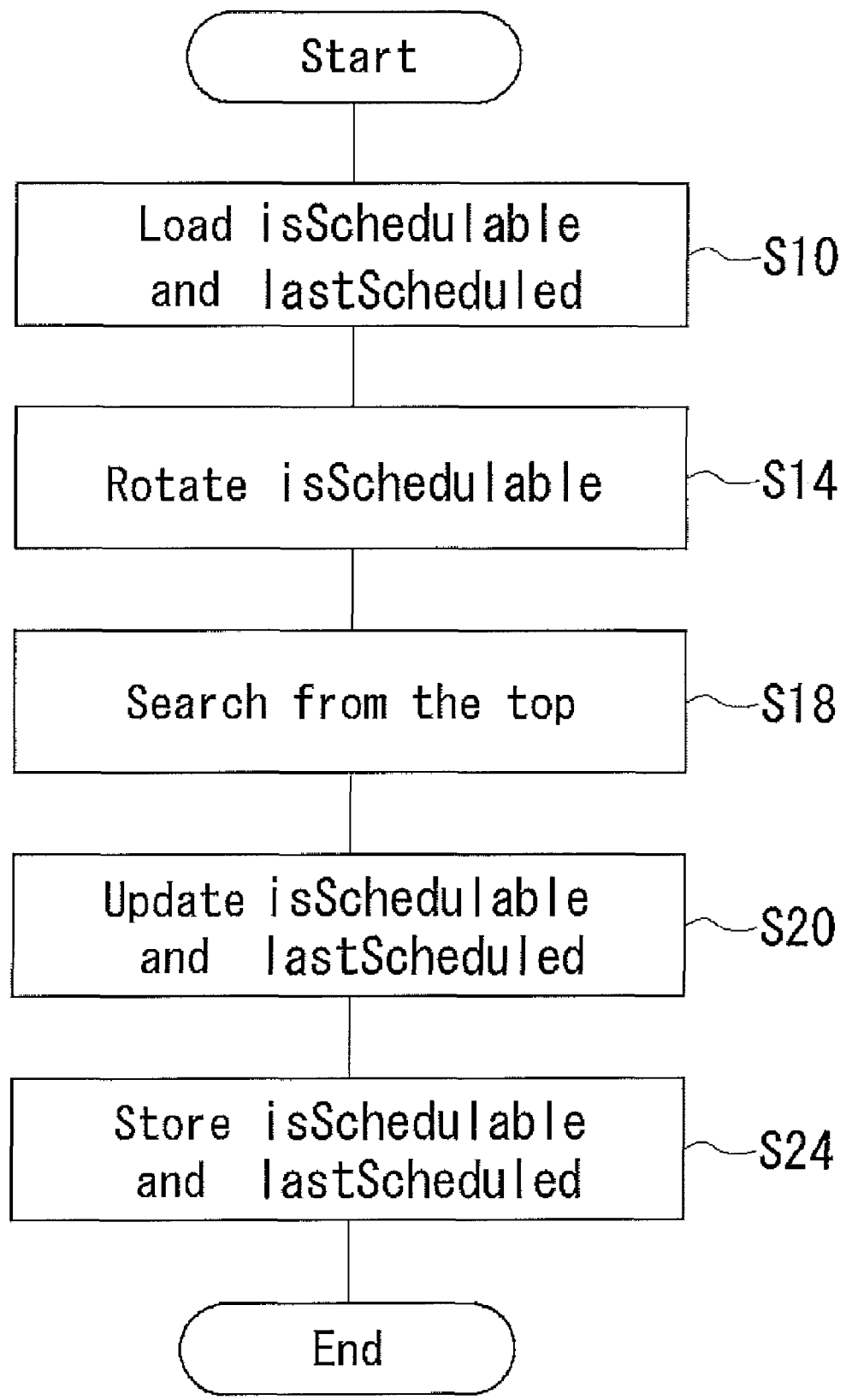
FIG. 5 is a flowchart showing the processing by which the processors select a thread.

The processing units 10 progress processing and generate threads. The threads generated are also executed by any of the processing units 10. When waiting threads occur, the task queue is put to use. A description will now be given, with reference to the flowchart of FIG. 5, of the processing by which the processing units 10 select the next thread to execute, for example, starting from the state of the task queue shown in FIG. 4, and the processing of updating the thread information in accordance with this selection.

In the state shown in FIG. 4, the processing units 10 of the multiprocessor system 100 have respective threads under processing. There are three executable threads that are waiting, and the entities of these three respective threads are stored in the main memory 30.

Figure 6:
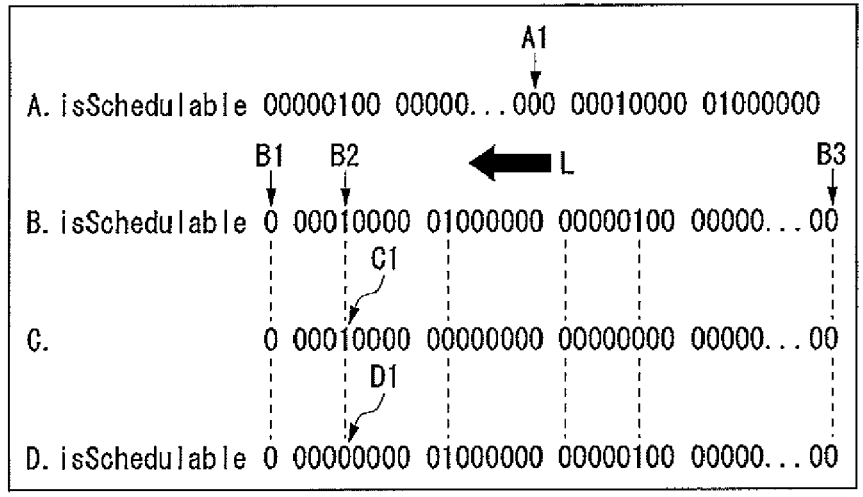
FIG. 6 is a diagram showing changes of the thread information in accordance with the processing shown in FIG. 5.

In this state, if one processing unit 10 ends to process the thread under processing, the processor 12 of this processing unit 10 loads the bit string isSchedulable and lastScheduled included in the thread information 40 into the local memory 14 in order to select the next thread to execute (S10). In the multiprocessor system 100, the processing units 10 perform the processing pertaining to the thread information 40 using atomic commands. In this instance, for example, "lwarx" or "getllar" is used as a command for loading the thread information 40. The bit string isSchedulable shown in the field A of FIG. 6 is the bit string isSchedulable shown in FIG. 4.

The processor 12 rotates the loaded bit string isSchedulable (the bit string in the field A of FIG. 6) in the direction shown by the arrow L, i.e., to the left so that the bit having the same number as the value of lastScheduled (the bit designated by the arrow A1 of FIG. 6) comes to the end (S14). This turns the bit string isSchedulable in the field A of FIG. 6 into the bit string isSchedulable in the field B of the same diagram. As shown in the diagram, the bit having the number of (lastScheduled+1) (being the bit designated by the arrow B1) lies at the top of the bit string isSchedulable, and the bit having the number of lastScheduled (being the bit designated by the arrow B3) comes to the end of the bit string isSchedulable.

The processor 12 then searches the rotated bit string isSchedulable for a bit having a value of "1" in succession from the top, and obtains the number of the first detected bit (being the bit designated by the arrow B2) as the number of the next thread to execute (S18). An example of the command that can be used for the bit search is "Count Leading Zero," which counts the number of consecutive bits having a value of "0" from the top of the bit string isSchedulable. A value that is determined by adding (lastScheduled+1) to the value obtained by "Count Leading Zero" (four, in the example of the bit string isSchedulable in the field B shown in FIG. 6) is selected as the number of the next thread to be executed.

The processor 12 then sets the value of the bit having the selected number to "0" and sets lastScheduled to this number, thereby updating the thread information 40 (S20). The updated thread information 40 is stored into the main memory 30 (S24). In this instance, the bit values are updated using a 128-bit bit string shown in the field C of FIG. 6. The bit string of the field C contains 128 bits, and only the bit having the same number as the number selected at step S18 (being the bit designated by the arrow C1) has a value of "1." The processor 12 updates the bit string isSchedulable of the field B in FIG. 6 by performing an arithmetic operation between the bit string isSchedulable of the field B and the bit string of the field C with "AtomicAndc" command. The updated bit string isSchedulable may also be stored using such a command as "stwcx" or "putllc."

The field D of FIG. 6 shows the updated thread information 40. In this instance, the bit selected as the next thread to be executed (being the bit designated by the arrow D1) is the bit to indicate the last executed thread, and its value is changed from "1" to "0."

Subsequently, the processor 12 refers to the thread address information 50 to acquire the starting address of a thread entity 60 that corresponds to the thread of the selected number, and loads the thread entity 60 from the area designated by this starting address to the local memory 14 for processing.

Figure 7:
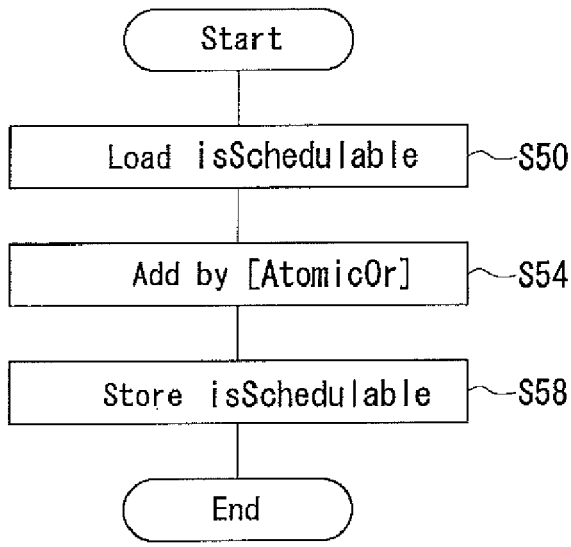
FIG. 7 is a flowchart showing the processing by which the processors add a thread.

A description will now be given, with reference to the flowchart of FIG. 7, of the processing for adding a new executable thread to the task queue.

Figure 8:
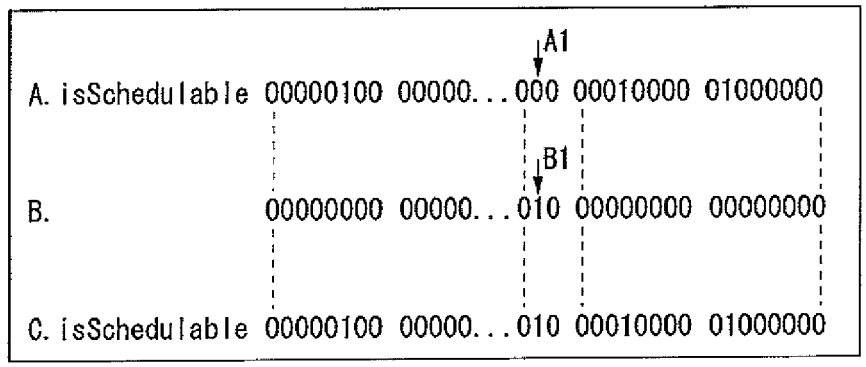
FIG. 8 is a diagram showing changes of the thread information in accordance with the processing shown in FIG. 7.

In order to add a new executable thread to the task queue, the processor 12 of a processing unit 10 loads the bit string isSchedulable included in the thread information 40 into the local memory 14 (S50). For example, this bit string isSchedulable is a bit string isSchedulable shown in field A of FIG. 8. The processor 12 selects the number of any one bit that has a value of "0" (for example, the bit designated by the arrow A1) from among the individual bits of the bit string isSchedulable of the field A, as the bit number of the thread to be added. Then, the processor 12 performs an arithmetic operation between the bit string isSchedulable of the field A and a bit string of the field B with "AtomicOr" command, thereby obtaining the bit string isSchedulable shown in the field C (S54). The bit string shown in the field B of FIG. 8 contains 128 bits, and only the bit having the same number as the number selected by the processor 12 (being the bit designated by the arrow B1) has a value of "1."

Subsequently, the processor 12 stores the bit string isSchedulable obtained at step S54 (being the bit string in the field C of FIG. 8) into the main memory 30, and ends the thread-adding update of the thread information 40 (S58).

The processor 12 then copies the entity of the thread to be added to an area that is allocated for the bit number selected at step S54, and ends the thread-adding processing.

As detailed above, according to the multiprocessor system 100 shown in FIG. 1, the processing of selecting a thread from the task queue and the processing of updating the task queue are performed by the individual processors 12 themselves. This makes it possible to improve the processing efficiency of the entire system.

In addition to this, when creating the task queue, the thread information and thread entities are stored separately so that the thread selection and updating can be performed using the thread information alone. This realizes a multiprocessor system of even higher efficiency.

Furthermore, the use of the two variables, or the bit string isSchedulable and lastScheduled, as the thread information makes it possible to perform thread selection and updating using atomic commands. As a result, a lockless task queue is realized.

The realization of the lockless task queue can solve the dilemma of whether or not to accept interrupts during scheduling.

Moreover, the information on the last executed thread is retained, so that threads other than the last executed thread are selected by priority. The information is also updated in accordance with this selection. Consequently, even when the last executed thread becomes executable again, other executable threads are executed by priority. This makes it possible to maintain fairness, which is important when scheduling threads.

The multiprocessor system 100 shown in FIG. 1 is a multiprocessor system that uses kernel schedulers alone. Nevertheless, the scheduling method employed in the multiprocessor system 100 can also be applied to systems that use user-level schedulers which are realized on threads running on the respective processors. In that instance, it is possible to solve the dilemma of whether or not to accept interrupts during scheduling, as well as to solve the aforementioned problems ascribable to the use of user-level schedulers.

Up to this point, the present invention has been described in conjunction with the embodiment thereof. The foregoing embodiment has been given solely by way of illustration. It will be understood by those skilled in the art that various modifications may be made to combinations of the foregoing components and processes, and all such modifications are also intended to fall within the scope of the present invention.

Moreover, while the embodiment shown in FIG. 1 is a system in which each individual processor performs scheduling autonomously, the scheduling method of the present invention is not limited to such a system. It may also be applied to systems in which scheduling is performed, for example, by a single management unit.

Devices to which the present invention is applied are also intended to fall within the scope of the present invention. These devices are not limited to personal computers, servers, and the like, but may also include cellular phones, game consoles, mobile computers, personal digital assistants (PDAs), and digital television sets.

As has been described above, the present invention is applicable to electronic apparatuses which handle a plurality of processes in parallel, such as a computer, a cellular phone, and a game console.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A scheduling method comprising:
   giving a fixed identification number to each of a plurality of execution units to be executed by a plurality of processors included in a multiprocessor system;
   retaining, in a memory accessible by each of the plurality of processors, execution unit information including executable-or-not information and last executed information, separately from the execution units, the executable-or-not information indicating whether each of the execution units is in a waiting state or not in association with the fixed identification numbers of all the execution units which are given the fixed identification numbers, the last executed information indicating the fixed identification number of a last selected execution unit as being next executed among the execution units; and
   searching for the fixed identification number of a next execution unit in the waiting state in order of the fixed identification numbers starting from the fixed identification number of the last selected execution unit based on the execution unit information, selecting such fixed identification number as the fixed identification number of an execution unit to be executed by a processor, and updating the execution unit information.

2. The scheduling method according to claim 1, wherein the selecting and updating is performed by a processor that itself executes the execution unit corresponding to the selected fixed identification number.

3. The scheduling method according to claim 1, wherein:

the executable-or-not information is retained in the form of a bit string each single bit of which is allocated in association with the fixed identification numbers in numerical order; and each of the selecting and updating steps is performed by atomic operation.

4. The scheduling method according to claim 3, wherein:

the bit string is rotated so that a bit corresponding to the last selected execution unit comes to the end; and the selecting step is performed by searching the rotated bit string for the bit of an execution unit in the waiting state in succession from the top.

5. The scheduling method according to claim 2, wherein:

the selecting and updating steps are performed after the execution unit information is loaded to a local memory corresponding to the processor that executes the execution unit corresponding to the selected fixed identification number; and after the updating is completed, the updated execution unit information is further stored in the memory.

6. The scheduling method according to claim 5, including:

further retaining address information in the memory, the address information associating the fixed identification numbers with addresses where contexts of the execution units corresponding to the fixed identification numbers are stored in the memory; and after the execution unit information is stored into the memory, referring to the address information and reading the context of the execution unit corresponding to the selected fixed identification number from the memory, thereby executing the execution unit.

7. An information processing apparatus, comprising:

a plurality of processors operating to execute a plurality of execution units;

a memory which is accessible by each of the plurality of processors and retains execution unit information including executable-or-not information and last executed information, separately from the execution units, the executable-or-not information indicating whether each of execution units is in a waiting state or not in association with all fixed identification numbers given to the respective execution units, the last executed information indicating the fixed identification number of a last selected execution unit as being next executed among the execution units;

an execution unit selecting unit which searches for the fixed identification number of a next execution unit in the waiting state in order of the fixed identification numbers starting from the fixed identification number of the last selected execution unit based on the execution unit information, selects such fixed identification number as the fixed identification number of an execution unit to be executed by a processor; and an execution unit information updating unit which updates the execution unit information in accordance with the selection.

8. The information processing apparatus according to claim 7, wherein the execution unit selecting unit and the execution unit information updating unit are composed of a processor that itself executes the execution unit corresponding to the selected fixed identification number.

9. The information processing apparatus according to claim 7, wherein:

the memory retains the executable-or-not information in the form of a bit string each single bit of which is allocated in association with the fixed identification numbers in numerical order; and the execution unit selecting unit and the execution unit information updating unit perform the selecting and the updating by atomic operation.

10. The information processing apparatus according to claim 9, wherein:

the execution unit selecting unit rotates the bit string so that a bit corresponding to the last executed execution unit comes to the end; and the selecting is performed by searching the rotated bit string for the bit of an executable execution unit in succession from the top.

11. A computer executing computer program code stored in a non-transitory, computer readable medium, the program code operating to cause the computer to perform actions, the computer program code comprising:

a program code module for retaining, in a memory accessible by each of a plurality processors included in a multiprocessor system which executes a plurality of execution units, execution unit information including executable-or-not information and last executed information, separately from the execution units, the executable-or-not information indicating whether each of execution units is in a waiting state or not in association with all fixed identification numbers given to the respective execution units, the last executed information indicating the fixed identification number of a last selected execution unit as being next executed among the execution units; and a program code module for searching for the fixed identification number of a next execution unit in the waiting state in order of the fixed identification numbers starting from the fixed identification number of the last selected execution unit based on the execution unit information, selecting such fixed identification number as the fixed identification number of an execution unit to be executed by a processor, and updating the execution unit information.

12. A non-transitory, computer readable recording medium containing a program, the program for causing a computer to perform the functions of:

retaining, in a memory accessible by each of a plurality of processors, execution unit information including executable-or-not information and last executed information, separately from the execution units, the executable-or-not information indicating whether each of the execution units is in a waiting state or not in association with the fixed identification numbers of all the execution units which are given the fixed identification numbers, the last executed information indicating the fixed identification number of a last selected execution unit as being next executed among the execution units; and searching for the fixed identification number of a next execution unit in the waiting state in order of the fixed identification numbers starting from the fixed identification number of the last selected execution unit based on the execution unit information, selecting such fixed identification number as the fixed identification number of an execution unit to be executed by a processor, and updating the execution unit information.

\* \* \* \* \*